(12) United States Patent
Tokgoz et al.

(10) Patent No.: US 11,158,945 B2
(45) Date of Patent: Oct. 26, 2021

(54) PHASED ARRAY ANTENNA APPARATUS AND CONTROL METHOD THEREFOR

(71) Applicant: NEC Corporation, Japan (JP)

(72) Inventors: Korkut Tokgoz, Tokyo (JP); Naoki Oshima, Tokyo (JP); Kazuaki Kunihiro, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/032,302

(22) Filed: Sep. 25, 2020

(65) Prior Publication Data
US 2021/0098874 A1    Apr. 1, 2021

(30) Foreign Application Priority Data
Sep. 27, 2019    (JP) .............................. JP2019-176396

(51) Int. Cl.
*H04M 1/00*    (2006.01)
*H01Q 3/40*    (2006.01)
*H04B 7/0452*    (2017.01)
*H01Q 1/24*    (2006.01)

(52) U.S. Cl.
CPC .............. *H01Q 3/40* (2013.01); *H04B 7/0452* (2013.01); *H01Q 1/246* (2013.01)

(58) Field of Classification Search
CPC ........ H01Q 3/36; H01Q 21/065; H01Q 21/24; H01Q 3/24; H01Q 3/26; H01Q 3/40; H01Q 1/38; H01Q 21/245; H01Q 25/00; H04B 1/44; H04B 1/18; H04B 7/0452
See application file for complete search history.

(56) References Cited

U.S. PATENT DOCUMENTS

| | | | | |
|---|---|---|---|---|
| 10,620,297 | B2* | 4/2020 | Cohen | G01S 7/006 |
| 10,693,227 | B2* | 6/2020 | Igura | H01Q 3/26 |
| 10,790,915 | B2* | 9/2020 | DaSilva | H01Q 3/267 |
| 2018/0205155 | A1* | 7/2018 | Mizunuma | H01Q 21/0025 |
| 2021/0057817 | A1* | 2/2021 | Lenive | H01Q 3/46 |

FOREIGN PATENT DOCUMENTS

| | | |
|---|---|---|
| JP | 2001-177328 A | 6/2001 |
| JP | 2016-076929 A | 5/2016 |

* cited by examiner

*Primary Examiner* — Nhan T Le
(74) *Attorney, Agent, or Firm* — Sughrue Mion, PLLC

(57) ABSTRACT

A phased array antenna apparatus 10 according to an example embodiment includes at least four patch antennas 6 arranged in a two-dimensional array, and a semiconductor IC 1 connected to the patch antennas 6, in which the semiconductor IC 1 includes at least two first input/output terminals 5 through which a transmission/reception signal is input/output between the phased array antenna apparatus and an external apparatus connected to the phased array antenna apparatus, a plurality of second input/output terminals 4 connected to feeding points 8 of the patch antennas 6 through respective feed lines 7, the plurality of second input/output terminals being terminals through which the transmission/reception signal is input/output, and a matrix switch 2 capable of changing a connection relation between the first input/output terminals 5 and the second input/output terminals 4.

10 Claims, 18 Drawing Sheets

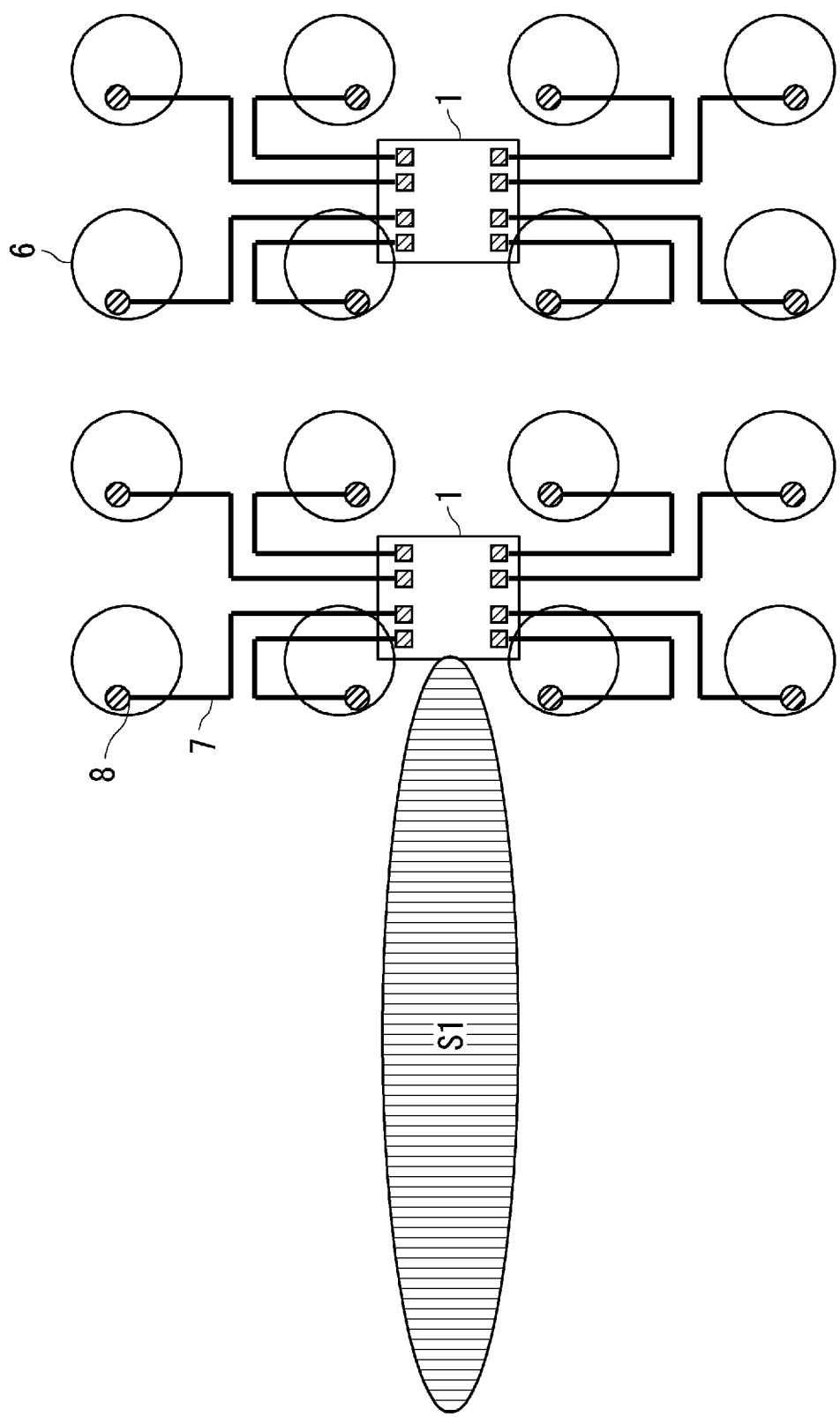

PHASED ARRAY ANTENNA APPARATUS AND CONTROL METHOD THEREFOR

INCORPORATION BY REFERENCE

This application is based upon and claims the benefit of priority from Japanese patent application No. 2019-176396, filed on Sep. 27, 2019, the disclosure of which is incorporated herein in its entirety by reference.

TECHNICAL FIELD

The present disclosure relates to a phased array antenna apparatus and its control method.

BACKGROUND ART

In recent radio communication apparatuses such as radio base stations for 5th Generation mobile communication systems, a beamforming technology has become important in order to improve the utilization ratio of frequencies. In the beamforming technology, radio waves are emitted only in specific directions, so that frequencies are spatially reused. Further, as an application of the beamforming technology, a MIMO (Multiple Input Multiple Output) technology that enables large-capacity transmission by multiplexing radio waves having the same frequency has also become important.

As one of the multiplexing techniques, a polarization multiplexing method has also been commercially used. In the polarization multiplexing method, a vertically polarized wave and a horizontally polarized wave in which different data are superimposed are multiplexed and transmitted at the same frequency, and then demultiplexed on the receiving side. In order to realize the above-described beamforming and the MIMO, a phased array antenna apparatus is used. In the phased array antenna, a plurality of antenna elements are arranged in an array, and each of the antenna elements is excited (i.e., driven) by feeding a signal having a predetermined amplitude and a predetermined phase to the antenna element.

Japanese Unexamined Patent Application Publication No. 2016-076929 (hereinafter also referred to as Patent Literature 1) discloses a radio base station apparatus including a plurality of antenna elements for transmitting and receiving signals having radio frequencies. This radio base station apparatus can change a correspondence relation between input ports and output ports in a transmission processing unit, and thereby can change its antenna configuration to one suitable for beamforming, one suitable for single-user MIMO, or one suitable for multi-user MIMO.

Japanese Unexamined Patent Application Publication No. 2001-177328 (hereinafter also referred to as Patent Literature 2) discloses a technique in which N array antennas are connected to M (M<N) reception systems and transmission systems through a common interface network, and their connection relation is changed by using a switch matrix. By adopting this configuration, the scale (e.g., the size) of the hardware of the whole apparatus is reduced.

In a phased array antenna apparatus including an array antenna including a plurality of planar antenna elements and a semiconductor IC chip in which a plurality of transmitters/receivers that feed signals to the respective antenna elements are mounted in an integrated manner, a suitable arrangement of input/output terminals on the semiconductor IC chip is determined by the arrangement of the antenna elements connected thereto and the positions of feeding points for the antenna elements. However, the arrangement of antenna elements and the positions of feeding points are changed depending on the system in which the phased array antenna apparatus is used and/or the purpose of the phase array antenna apparatus.

When the arrangement of antenna elements and the positions of feeding points do not coincide with the arrangement of input/output terminals on the semiconductor IC chip suitable therefor, the characteristics of the phased array antenna apparatus may deteriorate. For example, there may be an increase in power loss and/or the antenna pattern may be disturbed. This problem becomes particularly noticeable in high-frequency ranges in which frequencies are high and wavelengths are short. Further, if a dedicated semiconductor IC chip having a suitable arrangement of input/output terminals is prepared for each phased array antenna apparatus to solve the above-described problem, the development period and the cost increase. In Patent Literature 1, although the connection relation between antenna elements and input/output ports is changed, no consideration is given to the arrangement of the antenna elements and the feeding positions in the phased array antenna apparatus.

SUMMARY

In view of the above-described problem, an example object of the present disclosure is to provide a phased array antenna apparatus and its control method capable of changing a connection relation between antenna elements and input/output ports on a semiconductor IC chip according to the arrangement of the antenna elements and the positions of feeding points.

In a first example aspect, a phased array antenna apparatus includes at least four antenna elements arranged in a two-dimensional array, and a semiconductor chip connected to the antenna elements, in which the semiconductor chip includes: at least two first input/output terminals through which a transmission/reception signal is input/output between the phased array antenna apparatus and an external apparatus connected to the phased array antenna apparatus; a plurality of second input/output terminals connected to feeding points of the antenna elements through respective feed lines, the plurality of second input/output terminals being terminals through which the transmission/reception signal is input/output; and a matrix switch capable of changing a connection relation between the first input/output terminals and the second input/output terminals.

In another example aspect, a method for controlling a phased array antenna apparatus is a method for controlling a phased array antenna apparatus including at least four antenna elements arranged in a two-dimensional array and a semiconductor chip connected to the antenna elements, in which a connection relation between at least two first input/output terminals and a plurality of second input/output terminals is changed by a matrix switch according to an arrangement of the antenna elements and/or positions of feeding points in the antenna elements, the at least two first input/output terminals being terminals through which a transmission/reception signal is input/output between the phased array antenna apparatus and an external apparatus connected to the phased array antenna apparatus, and the plurality of second input/output terminals being terminals connected to the feeding points of the antenna elements through respective feed lines, and being terminals through which the transmission/reception signal is input/output.

BRIEF DESCRIPTION OF DRAWINGS

The above-described and other aspects, features and advantages of the present disclosure will become more apparent from the following description of certain example embodiments when taken in conjunction with the accompanying drawings, in which:

FIG. 8C shows an operation performed by the phased array antenna apparatus shown in FIGS. 8A and 8B;

EMBODIMENTS

Example embodiments according to the present disclosure will be described hereinafter with reference to the drawings. For clarifying the explanation, the following description and the drawings have been partially omitted and simplified as appropriate.

Figure 10A:
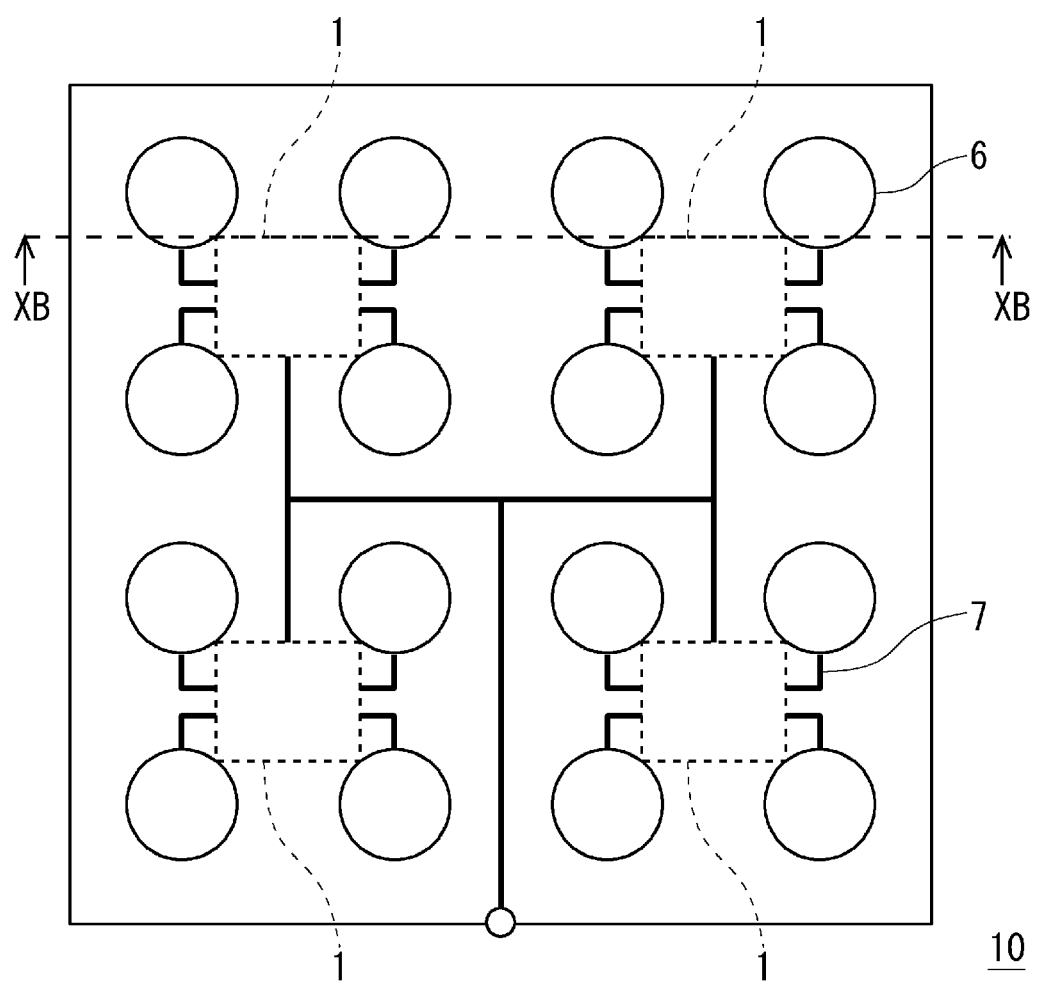
FIG. 10A shows a configuration of a phased array antenna apparatus.
Figure 10B:
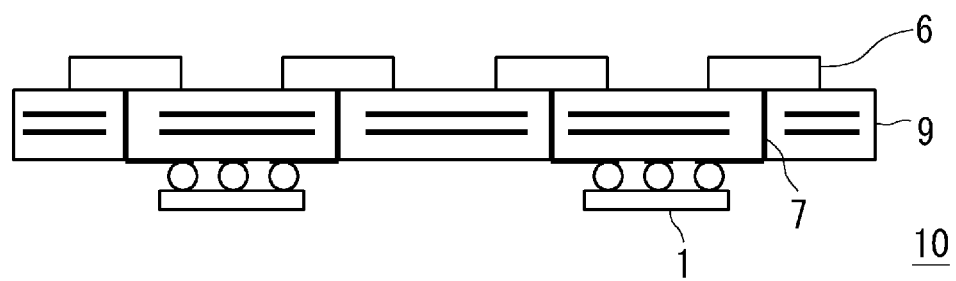
FIG. 10B is a cross-sectional view of the phased array antenna apparatus taken along a line XB-XB in FIG. 10A.

This example embodiment relates to a phased array antenna apparatus. FIG. 10A shows a configuration of a phased array antenna apparatus 10. FIG. 10B is a cross-sectional view of the phased array antenna apparatus taken along a line XB-XB in FIG. 10A. In FIG. 10A, semiconductor IC chips 1 are disposed on the underside of a multilayer printed circuit board 9. Therefore, they are indicated by broken lines.

The phased array antenna apparatus 10 includes patch antennas 6 which are arranged in an array at intervals of about a half (½) of the wavelength, and semiconductor IC chips 1 on each of which a plurality of transmitters/receivers that feed signals to the patch antennas 6 are mounted in an integrated manner. In the example shown in FIG. 10A, one semiconductor IC chip 1 is provided for every four patch antennas 6.

As shown in FIG. 10B, the patch antennas 6 are disposed on one of the surfaces of the multilayer printed circuit board 9. Although each of the patch antennas 6 is a circular planar antenna element in this example, they may have other shapes such as a square shape. The semiconductor IC chips 1 are mounted on the other surface of the multilayer printed circuit board 9. In each of the semiconductor IC chips 1, the same number of transmitters/receivers as the number of the feeding parts of the corresponding patch antennas 6 are mounted in an integrated manner, and each of the transmitters/receivers is connected to a feed line 7 through solder.

By adopting such a configuration, it is easy to make the lengths of the feed lines 7 from the semiconductor IC chips 1 to the respective patch antennas 6 as short as possible and equal to each other. As a result, the power losses in the feed lines 7 are reduced and the phase of each patch antenna 6 can be accurately controlled, thus making it possible to efficiently perform accurate beam forming. In particular, in millimeter-wave bands in which the loss caused by the feed line is large and the wavelength is short, an integrated structure of planar antenna elements and semiconductor IC chips like the one shown in FIGS. 10A and 10B has become mainstream.

First Example Embodiment

Figure 1:
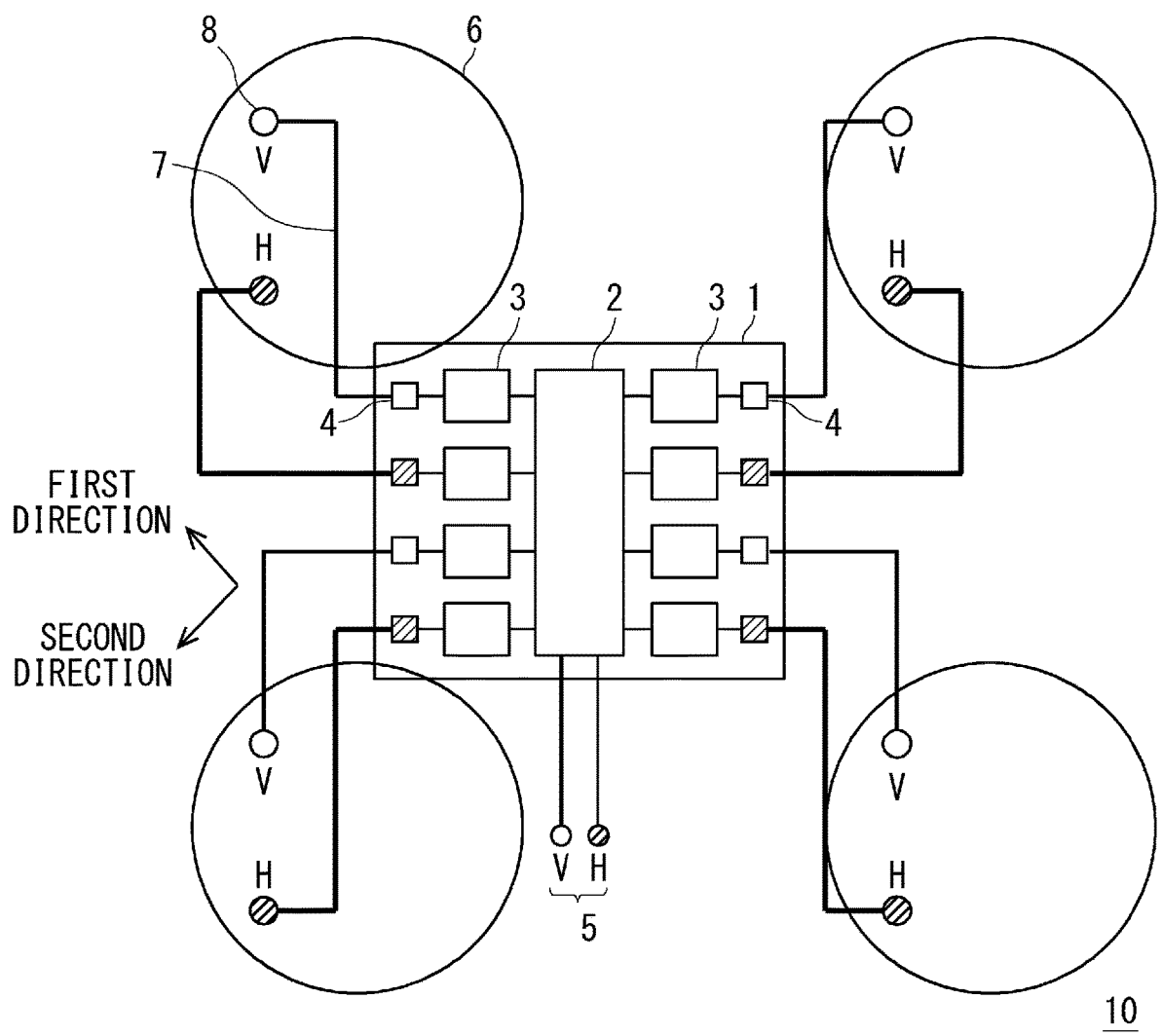
FIG. 1 shows a configuration of a phased array antenna apparatus according to a first example embodiment.

FIG. 1 shows a configuration of a phased array antenna apparatus according to a first example embodiment. FIG. 1 shows a part of a phased array antenna apparatus like the one shown in FIG. 10A, in which four patch antennas 6 and one semiconductor IC chip 1 are disposed. Note that in FIG. 1, in order to explain a positional relation between the patch antennas 6 and the semiconductor IC chip 1, parts that are hidden by the multilayer printed circuit board are also illustrated. In the following description, a case where the phased array antenna apparatus operates in a transmission mode will be described. However, by reversing the directions of signal flows, the same description can be applied to operations in a reception mode.

As shown in FIG. 1, the phased array antenna apparatus 10 includes at least four patch antennas 6 arranged in a two-dimensional array, and a semiconductor IC chip 1 connected to the patch antennas 6. Each of the patch antennas 6 is a polarization diversity planar antenna element that generates two types of polarized waves having polarization directions orthogonal to each other.

Each of the patch antennas 6 includes two feeding points 8 for generating an H-polarized wave and a V-polarized wave, respectively. In the example shown in FIG. 1, when viewed from the center of the patch antenna 6, the feeding point 8 for the V-polarized wave is disposed in a first direction, and the feeding point 8 for the H-polarized wave is disposed in a second direction orthogonal to the first direction. The polarization direction of each of the patch antennas 6 is inclined from the direction in which the patch antennas are arranged (hereinafter referred to as the arrangement direction of the array) by 45°.

Figure 2:
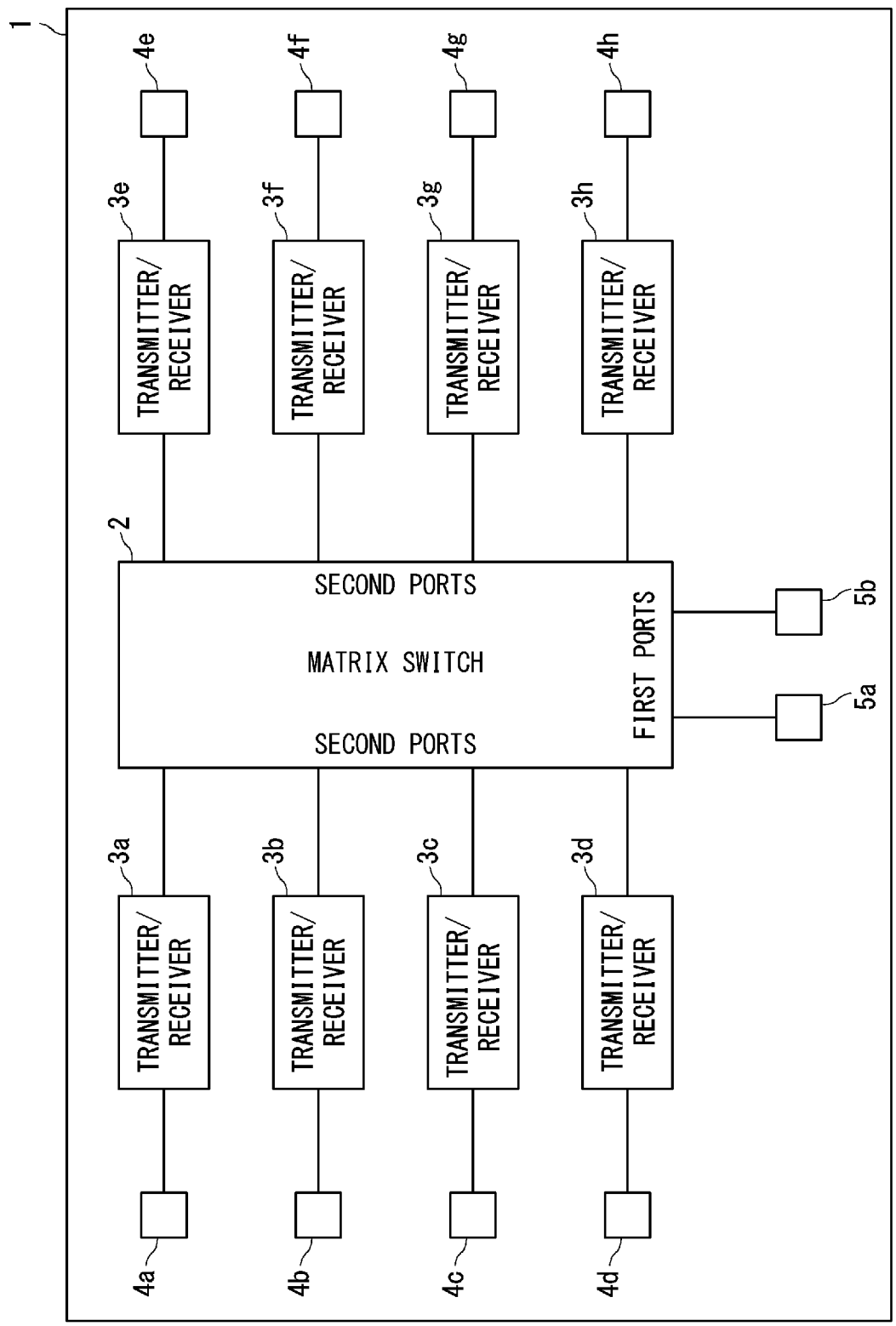
FIG. 2 shows a configuration of a semiconductor IC chip shown in FIG. 1.

The semiconductor IC chip 1 includes a matrix switch 2, transmitters/receivers 3, second input/output terminals 4, and first input/output terminals 5. FIG. 2 shows details of the configuration of the semiconductor IC chip 1. In this example, as shown in FIG. 2, the semiconductor IC chip 1 includes two first input/output terminals 5a and 5b (which are collectively referred to as the first input/output terminals 5), eight transmitters/receivers 3a to 3h (which are collectively referred to as the transmitters/receivers 3), and eight second input/output terminals 4a to 4h (which are collectively referred to as the second input/output terminals 4).

Transmission/reception signals are input/output between the phased array antenna apparatus 10 and an external apparatus connected to the phased array antenna apparatus 10 through the first input/output terminals 5. As shown in FIG. 1, a high frequency signal for a V-polarized wave is externally input to one of the first input/output terminals 5a and a high frequency signal for an H-polarized wave externally is input to the other first input/output terminal 5b.

The second input/output terminals 4 are connected to the feeding points 8 of the patch antennas 6 through the respective feed lines 7. Further, transmission/reception signals from/to the first input/output terminals 5 are input/output through the second input/output terminals 4. The transmitters/receivers 3a to 3h are connected to the corresponding second input/output terminals 4a to 4h, respectively. In order to simultaneously generate two types of polarized waves in each of the patch antennas 6, two transmitters/receivers 3 mounted in the semiconductor IC chip 1 in an integrated manner are connected to the two feeding points 8 disposed at different places in one patch antenna 6. For example, the transmitters 3a and 3b shown in FIG. 2 are connected to the respective feeding points 8 of the patch antenna 6 located in the upper left part in FIG. 1 through the respective second input/output terminals 4a and 4b.

The matrix switch 2 can change a connection relation between the first input/output terminals 5 and the second input/output terminal 4 according to the arrangement of the patch antennas 6 and/or the positions of the feeding points 8 in the patch antennas 6. High frequency signals for the V-polarized wave and the H-polarized wave supplied through the first input/output terminals 5 are input to two first ports of the 2×8 matrix switch 2, respectively, and then distributed to eight second ports thereof.

Figure 3:
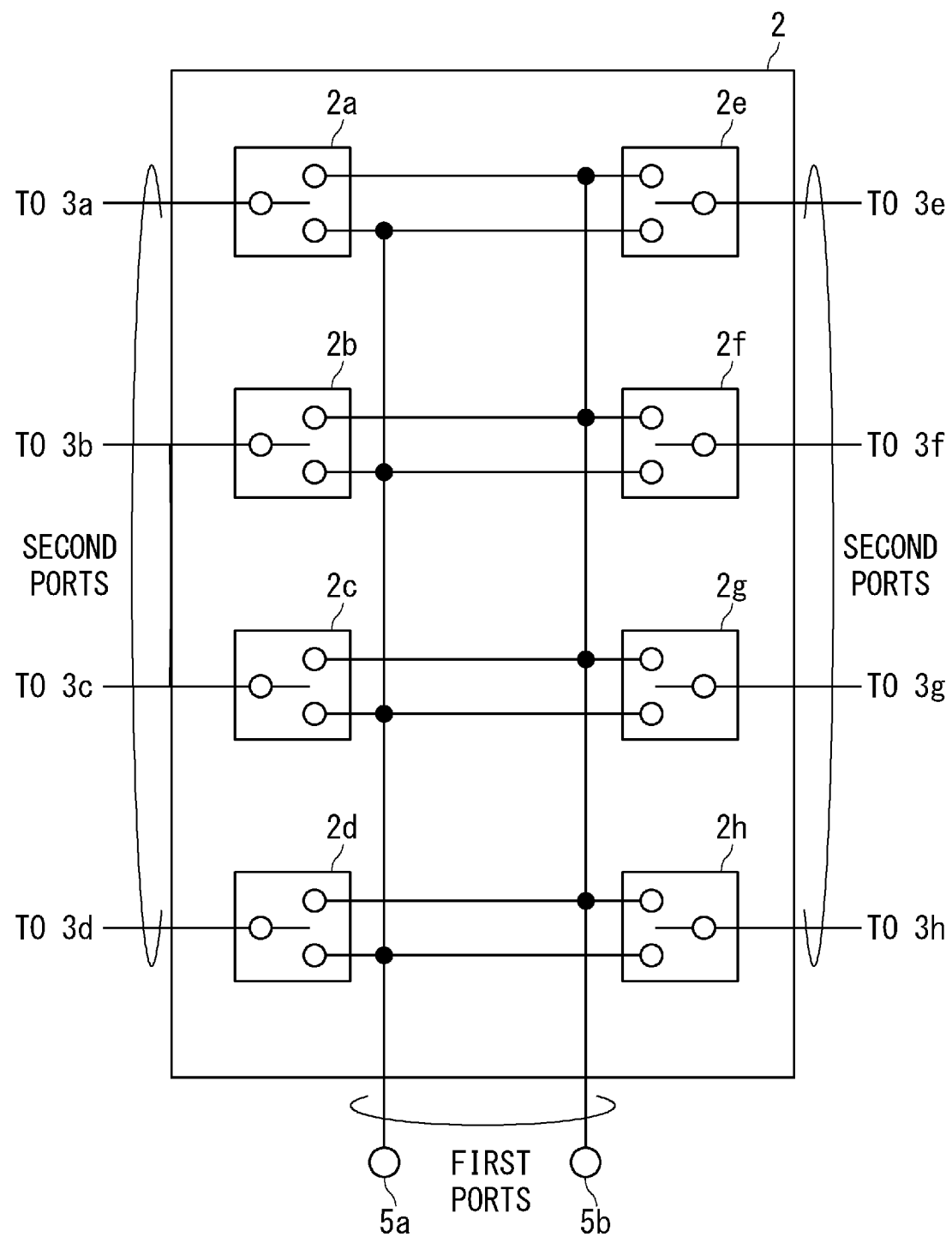
FIG. 3 shows a configuration of a matrix switch shown in FIG. 1.

FIG. 3 shows a configuration of the matrix switch 2 shown in FIG. 1. The matrix switch 2 includes eight SPDT (Single Pole Double Through) switches 2a to 2h. The matrix switch 2 can change the connection relation between the first input/output terminals 5 and the second input/output terminal 4 by switching the SPDT switches 2a to 2h.

Signals input to the first ports through the first input/output terminals 5a and 5b can be connected (i.e., supplied) to any of the eight second ports by switching the SPDT switches 2a to 2h. Note that although the configuration using the SPDT switches is shown above, the configuration of the matrix switch 2 is not limited such a configuration. That is, a configuration using SPST (Single Pole Single Through) switches or a configuration using DP8T (Double pole eight through) switches may also be used.

The transmitters/receives 3a to 3h are disposed between the eight ports of the matrix switch and the second input/output terminals 4a to 4h, respectively. The amplitudes and the phases of the signals distributed by the matrix switch 2 are adjusted to predetermined amplitudes and predetermined phases by the respective transmitters/receivers 3a to 3h, and the adjusted signals are output to the respective second input/output terminals 4a to 4h.

Figure 4A:
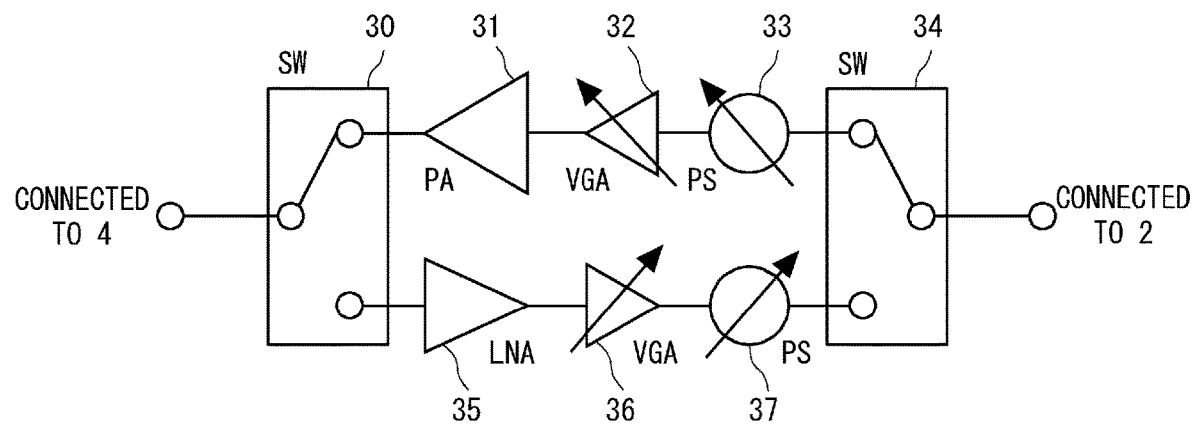
FIG. 4A shows an example of a configuration of a transmitter/receiver shown in FIG. 1.

FIG. 4A shows an example of a configuration of each of the transmitter/receivers shown in FIG. 1. As shown in FIG. 4A, the transmitter/receiver 3 includes a duplexer switch 30, a power amplifier (PA: Power Amplifier) 31, a variable gain amplifier (VGA: Variable Gain Amplifier) 32, a phase shifter (PS: Phase Shifter) 33, a duplexer switch 34, a low noise amplifier (LNA: Low Noise Amplifier) 35, a VGA 36, and a PS 37.

In this configuration, the path between the terminal 4 and the terminal 2 is switched between a transmission path including the PA 31, the VGA 32, and the PS 33, and a reception path including the LNA 35, the VGA 36, and the PS 37 by the duplexer switches 30 and 34. FIG. 4A shows states of the duplexer switches 30 and 34 in the transmitting operation. As shown in FIG. 4A, in the transmitting operation, after the phase of a signal input through the second port of the matrix switch 2 is shifted by a predetermined amount by the PS 33, the amplitude of the signal is adjusted to a predetermined amplitude level by the VGA 32. Further, the signal is amplified to predetermined power by the PA 31 and output through the second input/output terminal 4.

In the receiving operation, the reception path is selected by switching the duplexer switches 30 and 34. In the receiving operation, after a signal input through the second input/output terminal 4 is amplified by the LNA 35, the amplitude level and the phase of the amplified signal are adjusted by the VGA 36 and the PS 37, respectively, and the adjusted signal is output to the second port of the matrix switch 2 through the duplexer switch 34.

Figure 4B:
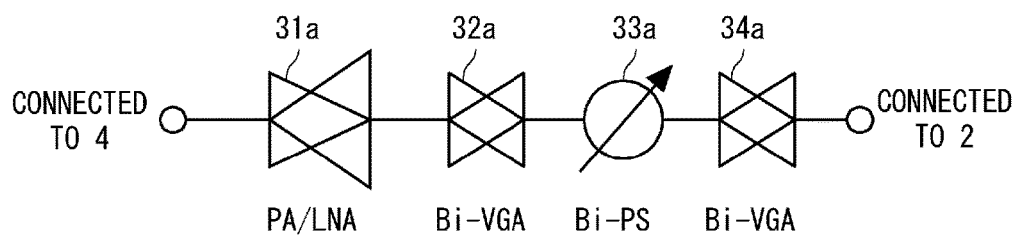
FIG. 4B shows another example of the configuration of the transmitter/receiver shown in FIG. 1.

FIG. 4B shows another example of the configuration of the transmitter/receiver shown in FIG. 1. As shown in FIG. 4B, the transmitter/receiver 3A includes a bidirectional amplifier (PA/LNA) 31a, a bidirectional variable gain amplifier (Bi-VGA) 32a, a bidirectional phase shifter (Bi-PS) 33a, and a Bi-VGA 34a. In this way, a common path can be used as both a transmission path and a reception path by using bidirectional amplifiers and bidirectional phase shifters. As a result, the area (i.e., the size) of the semiconductor IC chip can be reduced. Further, since the duplexer switches 30 and 34 are unnecessary, the loss can be reduced. Note that the order of VGAs and PSs, the number of amplification stages, and the like are not limited to those of the above-described configuration and can be changed as appropriate according to the system.

From the second input/output terminals 4a to 4h, two signals are fed to each of the four patch antennas 6 through the respective feed lines 7. As described above-described, each of the patch antennas 6 includes two feeding points 8 corresponding to a V-polarized wave and an H-polarized wave having polarization directions orthogonal to each other. Each of the feeding points 8 is connected to a respective one of the second input/output terminals 4 corresponding to the V-polarized wave and the H-polarized wave through a respective one of the feed lines 7. For example, as shown in FIG. 10B, the patch antennas 6 and the semiconductor IC chips 1 are formed on the top surface and the under surface, respectively, of the multilayer printed circuit board 9, and the feed lines 7 are formed in an inner layer of the multilayer printed circuit board 9.

Figure 5A:
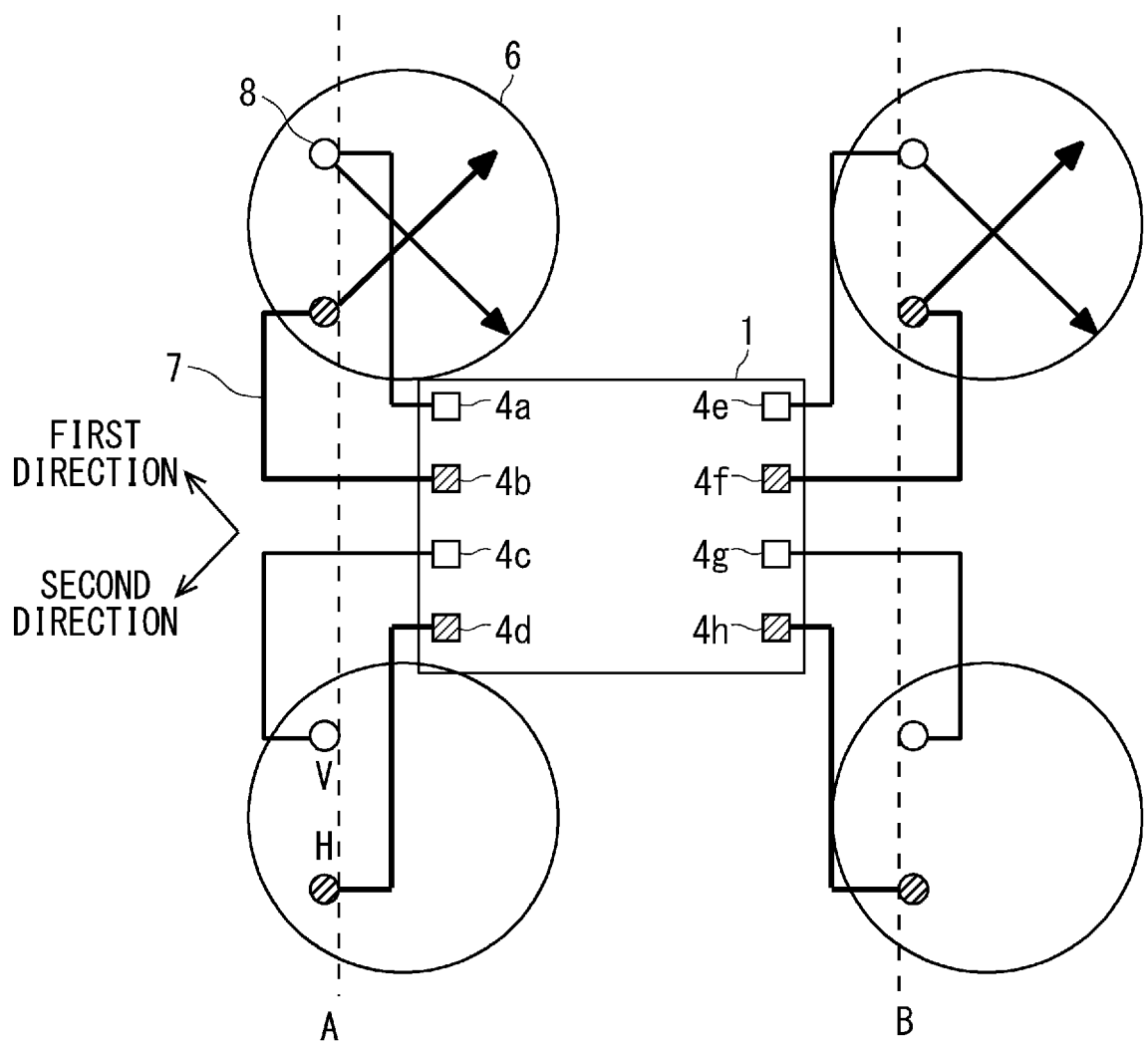
FIG. 5A shows a first example of a method for controlling a phased array antenna apparatus according to the first example embodiment.
Figure 5B:
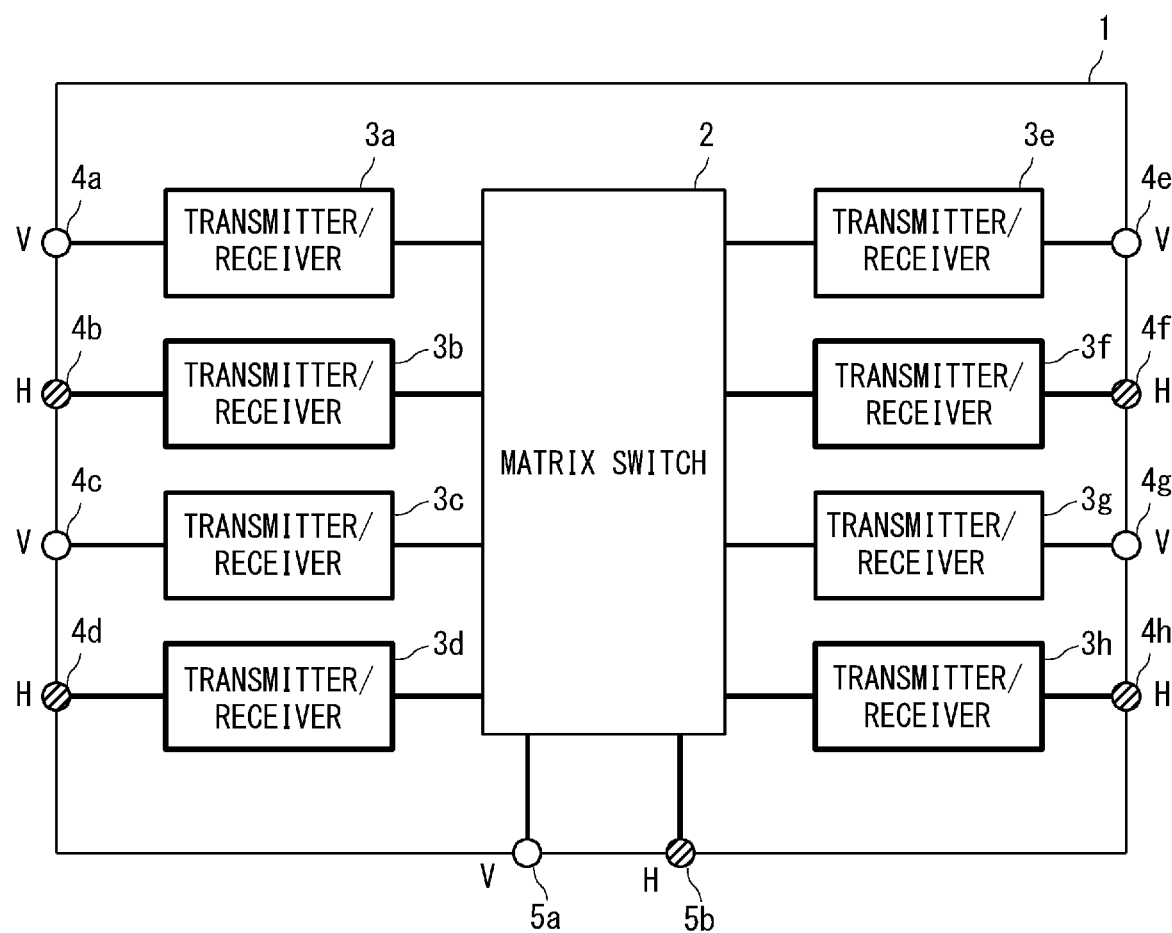
FIG. 5B shows the first example of the method for controlling the phased array antenna apparatus according to the first example embodiment.

A method for controlling a phased array antenna apparatus 10 according to an example embodiment will be described hereinafter. FIGS. 5A and 5B show a first example of a method for controlling a phased array antenna apparatus according to the first example embodiment. In the first example, similarly to FIG. 1, when viewed from the center of each of the patch antennas 6, a feeding point 8 for a V-polarized wave is disposed in a first direction, and a feeding point 8 for an H-polarized wave is disposed in a second direction orthogonal to the first direction. The polarization direction of each of the patch antennas 6 is inclined from the arrangement direction of the array by 45°.

The four feeding points of the patch antennas 6 at the upper left part and the lower left part thereof are arranged along a straight line A parallel to the arrangement direction of the patch antennas 6. Further, the four feeding points of the patch antennas 6 at the upper right part and the lower right part thereof are arranged along a straight line B parallel to the arrangement direction of the patch antennas 6. It is expected that, by adopting the above-described arrangement of the feeding points, the symmetry at the time when the angle of an emitted beam is changed over a certain range will be improved.

The semiconductor IC chip 1 has a rectangular shape and is disposed so that its left and right sides are parallel to the straight lines A and B. The second input/output terminals 4a to 4d are arranged along the left side of the semiconductor IC chip 1, and the second input/output terminals 4e to 4h are arranged along the right side thereof. The second input/output terminals 4a to 4d and the second input/output terminals 4e to 4h are arranged along different straight lines, i.e., the respective straight lines parallel to the straight lines A and B.

In this case, the second input/output terminals 4 are preferably disposed so that four terminals are arranged in the order of "V, H, V, H" on each of the left and right sides of the semiconductor IC chip 1, so that the lengths of the feed lines 7 can be made as short as possible and can be made equal to each other without making them intersect each other or bypass each other. Therefore, as shown in FIG. 5B, by setting the matrix switch 2 so that the second input/output terminals 4a to 4h becomes as follows: the second input/output terminals 4a to 4d are arranged in the order of "V, H, V, H" and the second input/output terminals 4e to 4h are arranged in the order of "V, H, V, H", the connection relation between the first input/output terminals 5a and 5b, to which signals for a V-polarized wave and an H-polarized wave are input respectively, and the second input/output terminals 4a to 4h is set. In this example, it is possible to make the characteristics of the two types of polarized waves equal to each other by making the effective lengths of all the feed lines 7 equal to each other.

Figure 6A:
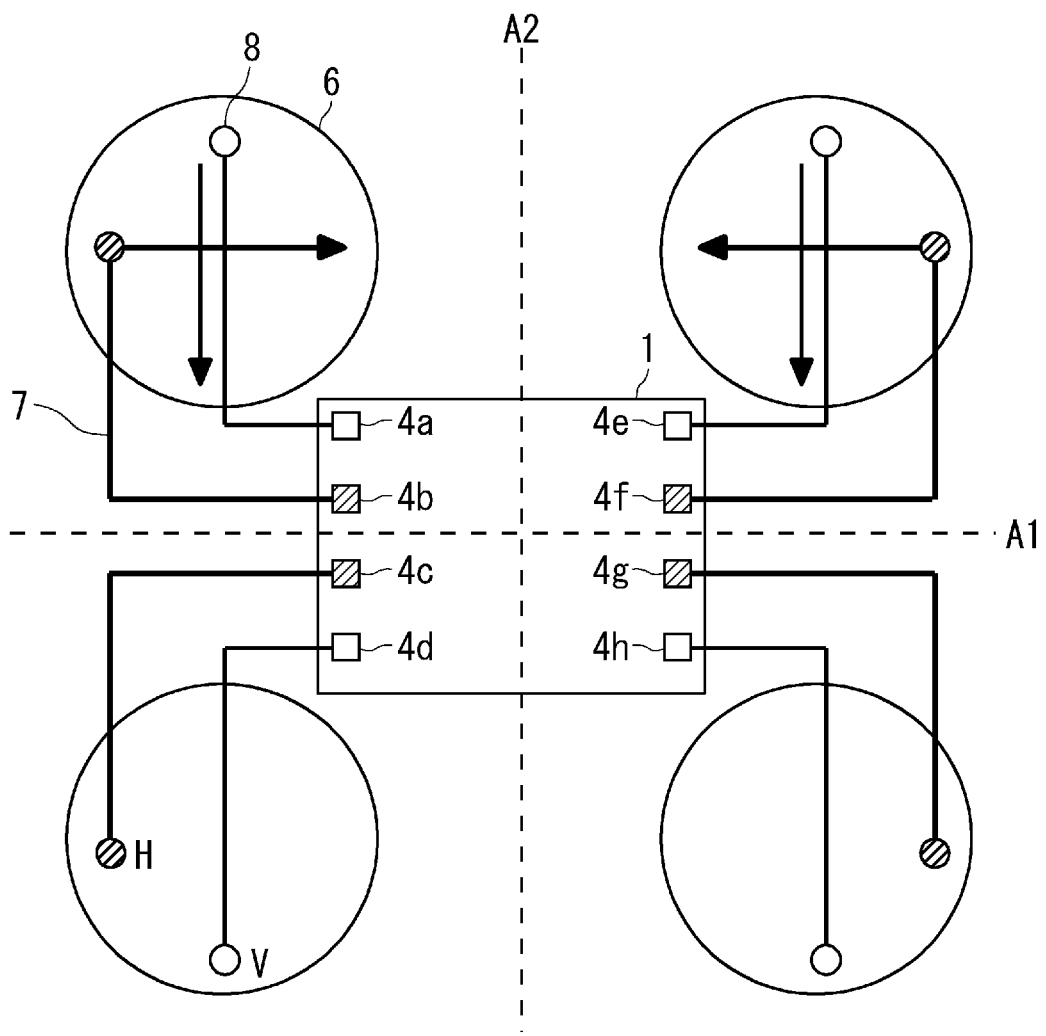
FIG. 6A shows a second example of a method for controlling a phased array antenna apparatus according to the first example embodiment.
Figure 6B:
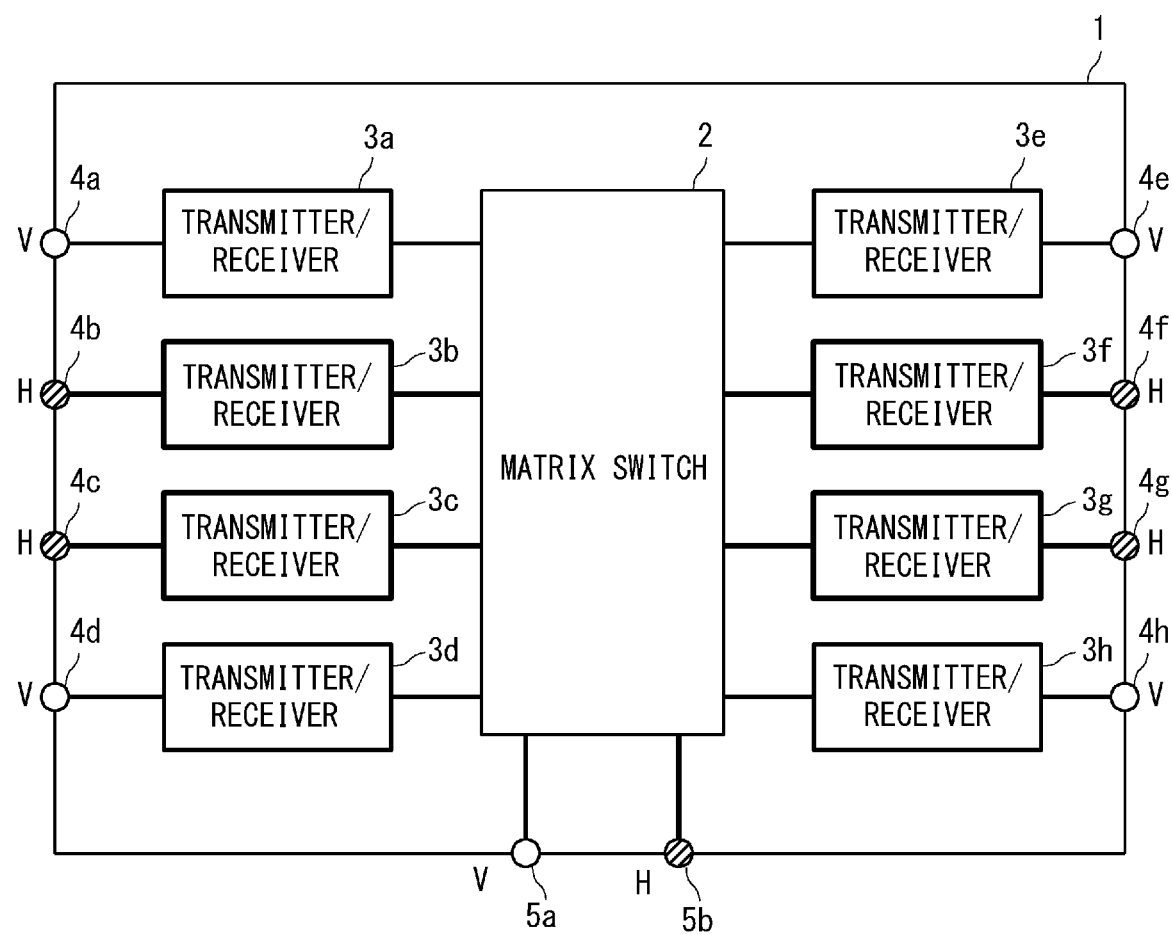
FIG. 6B shows the second example of the method for controlling the phased array antenna apparatus according to the first example embodiment.

FIGS. 6A and 6B show a second example of the method for controlling a phased array antenna apparatus according to the first example embodiment. In the second example, the polarization direction of each of the patch antennas 6 is coincident with the arrangement direction of the array. That is, the H-polarization direction is coincident with the direction in which the upper left and upper right patch antennas 6 are arranged, and the V-polarization direction is coincident with the direction in which the upper left and lower left patch antennas 6 are arranged.

Note that an axis passing through the middle point between the upper and lower patch antennas 6 is referred to as an axis A1, and an axis passing through the middle point between the left and right patch antennas 6 is referred to as an axis A2. In FIG. 6A, in a plan view, the feeding points 8 for the V-polarized wave are arranged symmetric to each other with the axis A1 being the symmetric line, and the feeding points 8 for the H-polarized wave are arranged symmetric to each other with the axis A1 being the symmetric line. Further, in the plan view, the feeding points 8 for the V-polarized wave are also arranged symmetric to each other with the axis A2 being the symmetric line, and the feeding points 8 for the H-polarized wave are also arranged symmetric to each other with the axis A2 being the symmetric line. It is expected that, by adopting the above-described arrangement of the feeding points, the isolation characteristics of the V-polarized wave and the H-polarized wave will be improved.

In this case, the second input/output terminals 4 are preferably disposed so that four terminals are arranged in the order of "V, H, H, V" on each of the left and right sides of the semiconductor IC chip 1, so that the lengths of the feed lines 7 can be made as short as possible and can be made equal to each other without making them intersect each other or bypass each other. Therefore, as shown in FIG. 6B, by setting the matrix switch 2 so that the second input/output terminals 4a to 4h becomes as follows: the second input/output terminals 4a to 4d are arranged in the order of "V, H, H, V" and the second input/output terminals 4e to 4h are arranged in the order of "V, H, H, V", the connection relation between the first input/output terminals 5a and 5b, to which signals for the V-polarized wave and the H-polarized wave are input respectively, and the second input/output terminals 4a to 4h is set. In this example, it is possible to make the characteristics of the same type of polarized waves of the patch antennas 6 constituting the array equal to each other by making the effective lengths of all the feed lines 7 equal to each other and making the shapes of the feed lines 7 for the same type of polarized waves identical to each other.

Figure 7A:
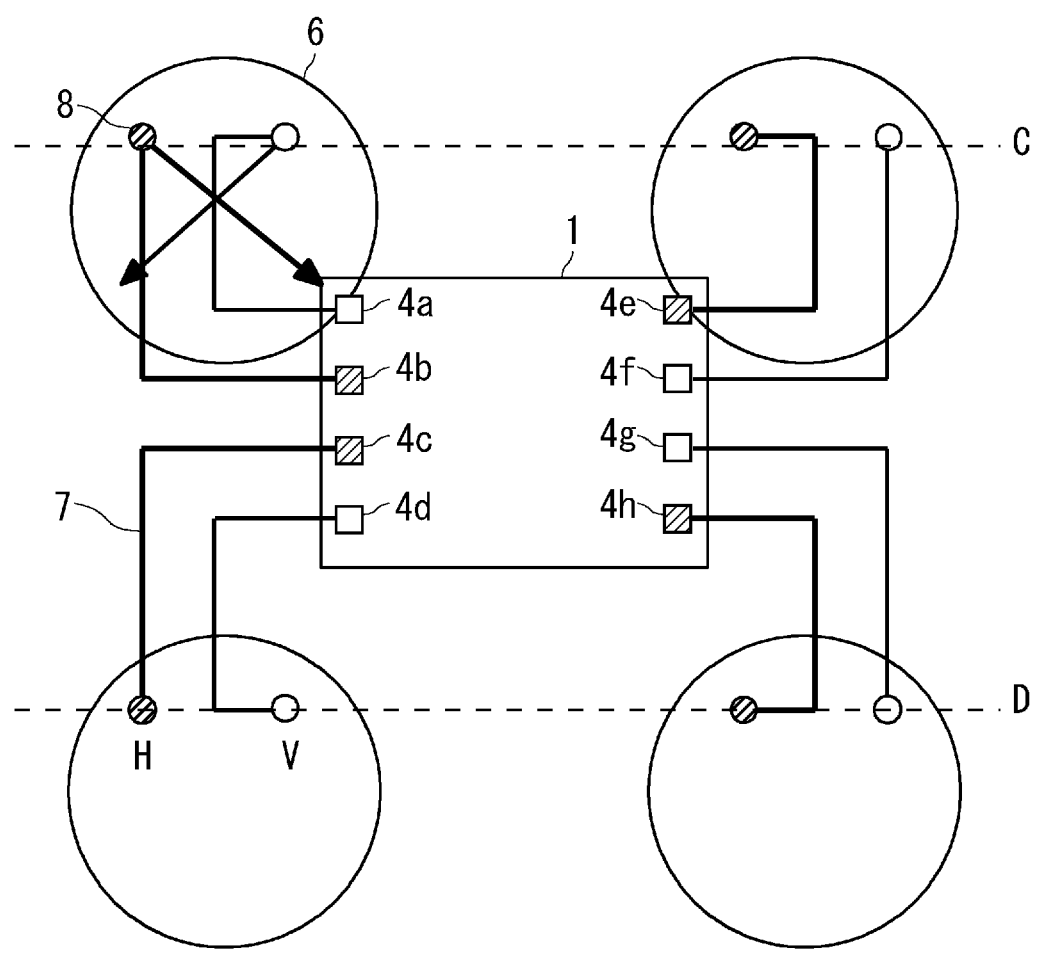
FIG. 7A shows a third example of a method for controlling a phased array antenna apparatus according to the first example embodiment.
Figure 7B:
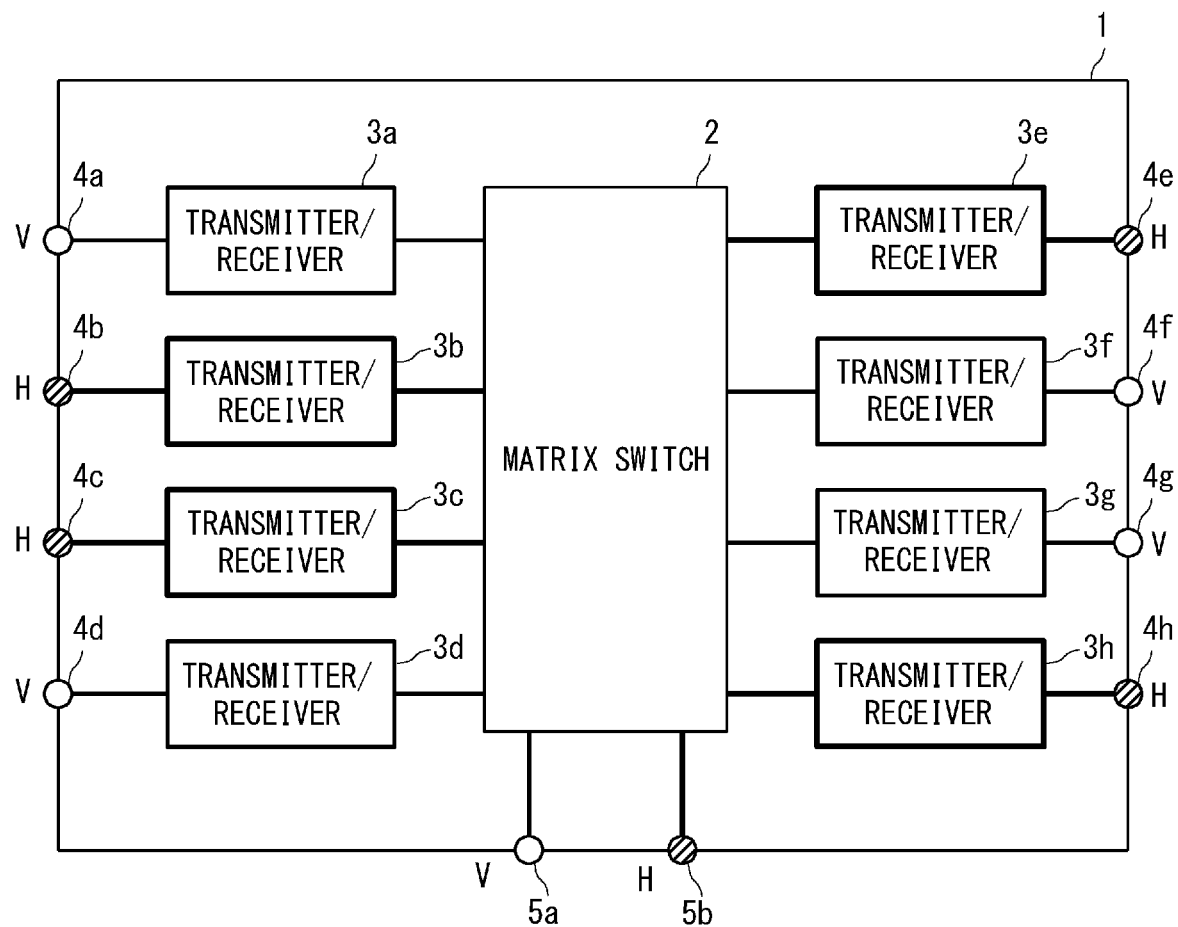
FIG. 7B shows the third example of the method for controlling the phased array antenna apparatus according to the first example embodiment.

FIGS. 7A and 7B show a third example of the method for controlling a phased array antenna apparatus according to the first example embodiment. In the third example, the polarization direction of each of the patch antennas 6 is inclined from the arrangement direction of the array by 45°.

The four feeding points of the upper left and upper right patch antennas 6 are arranged along a straight line C parallel to the arrangement direction of these patch antennas 6. Further, the four feeding points of the lower left and lower right patch antennas 6 are arranged along on a straight line D parallel to the arrangement direction of these patch antennas 6. It is expected that, by adopting the above-described arrangement of the feeding points, the symmetry at the time when the angle of an emitted beam is changed over a certain range will be improved. The second input/output terminals 4a to 4d and the second input/output terminals 4e to 4h of the semiconductor IC chip 1 are arranged along different straight lines orthogonal to the straight lines C and D.

In this case, the second input/output terminals 4 are preferably disposed so that four terminals are arranged in the order of "V, H, V, H" on the left side of the semiconductor IC chip 1 and other four terminals are arranged in the order of "H, V, V, H" on the right side thereof, so that the lengths of the feed lines 7 can be made as short as possible and can be made equal to each other without making them intersect each other or bypass each other. Therefore, as shown in FIG. 7B, by setting the matrix switch 2 so that the second input/output terminals 4a to 4h becomes as follows: the second input/output terminals 4a to 4d are arranged in the order of "V, H, H, V" and the second input/output terminals 4e to 4h are arranged in the order of "H, V, V, H", the connection relation between the first input/output terminals 5a and 5b, to which signals for the V-polarized wave and the H-polarized wave are input respectively, and the second input/output terminals 4a to 4h is set. In this example, it is possible to make the characteristics of the two types of polarized waves equal to each other by making the effective lengths of all the feed lines 7 equal to each other.

As shown in the first to third examples, how to set the positions of the feeding points 8 of the patch antennas 6 depends on the configuration of the system in which the phased array antenna apparatus is used, the use the phased array antenna apparatus, and the designer thereof. Further, the preferred arrangement of the terminals of the semiconductor IC chip also changes according thereto. According to the first example embodiment, it is possible to change the connection relation between the first input/output terminals 5 and the second input/output terminal 4 by the matrix switch 2 by using the same semiconductor IC chip 1, i.e., without preparing dedicated semiconductor IC chips. Therefore, it is possible to provide a layout suitable for any kind of feeding point arrangements, thus making it possible to reduce the development period and the cost for the phased array antenna apparatus.

Further, according to the first example embodiment, it is possible to make the feed lines of the phased array antenna apparatus as short as possible and to make them equal to each other, thus making it possible to reduce the power loss and the phase deviation. Therefore, it is possible to improve the characteristics of the phased array antenna apparatus 10, such as the power consumption thereof and the controllability of beam forming. Note that it is possible to make the characteristics of the patch antennas 6 constituting the array equal to each other by making the effective lengths of all the feed lines 7 equal to each other and making the shapes of them identical to each other. However, the present disclosure is not limited to these features. It is possible to make at least the characteristics of the same types of polarized waves equal to each other by making the effective lengths of the feed lines 7 for the same types of polarized waves equal to each other and making the shapes of them identical to each other.

Note that in the first example embodiment, examples in which the number of patch antennas 6 is four, and numbers of first ports and second ports are two and eight, respectively, are shown. However, the configuration of the present disclosure is not limited to such configurations. The number of patch antennas 6 may be four or more as long as they are formed in a two-dimensional array. Further, the number of the first ports is two or more and can be increased to the same number as the number of the second ports at the maximum. Further, the arrangement of feeding points 8 is not limited to those shown in the above-described-described examples. That is, the present disclosure can be applied to other arrangements.

Second Example Embodiment

Figure 8A:
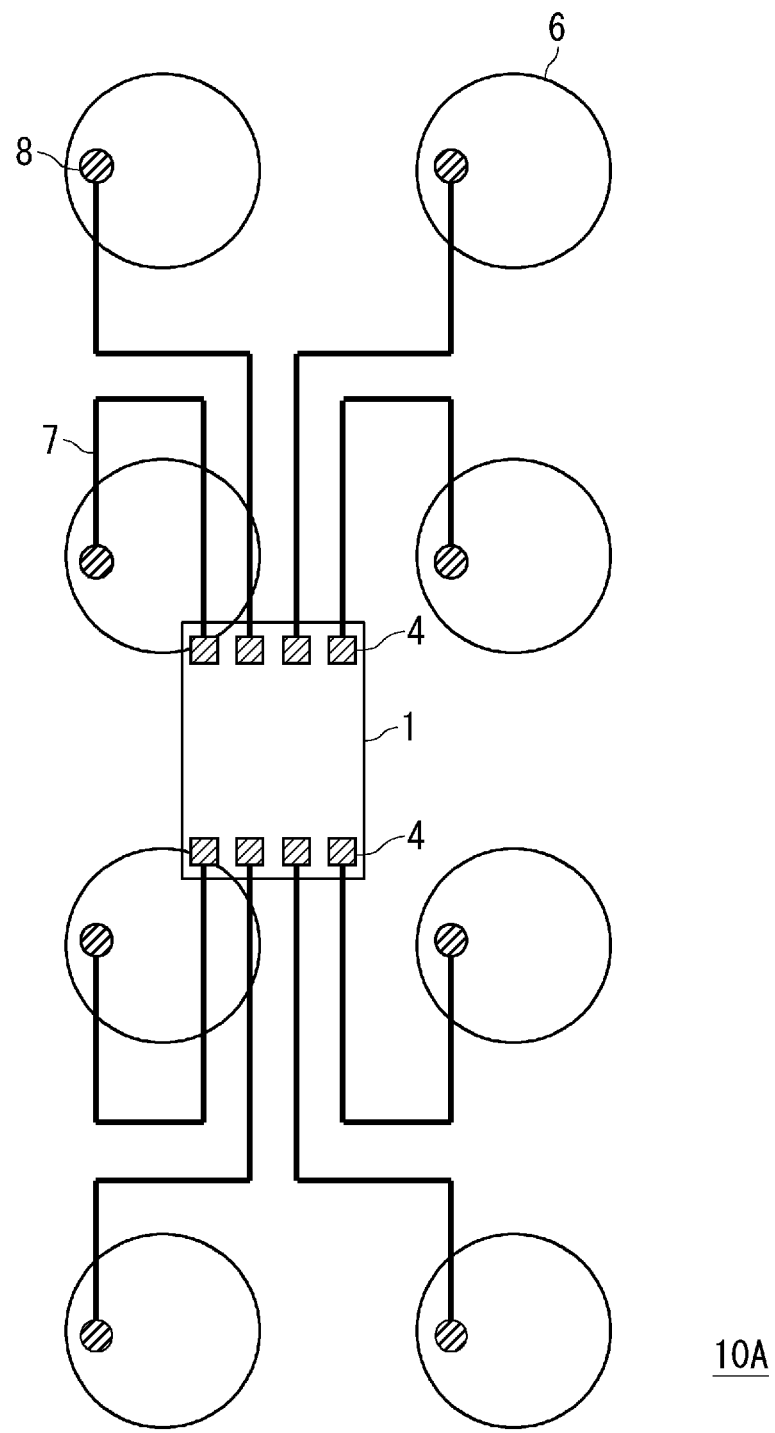
FIG. 8A shows a first example of a method for controlling a phased array antenna apparatus according to a second example embodiment.
Figure 9A:
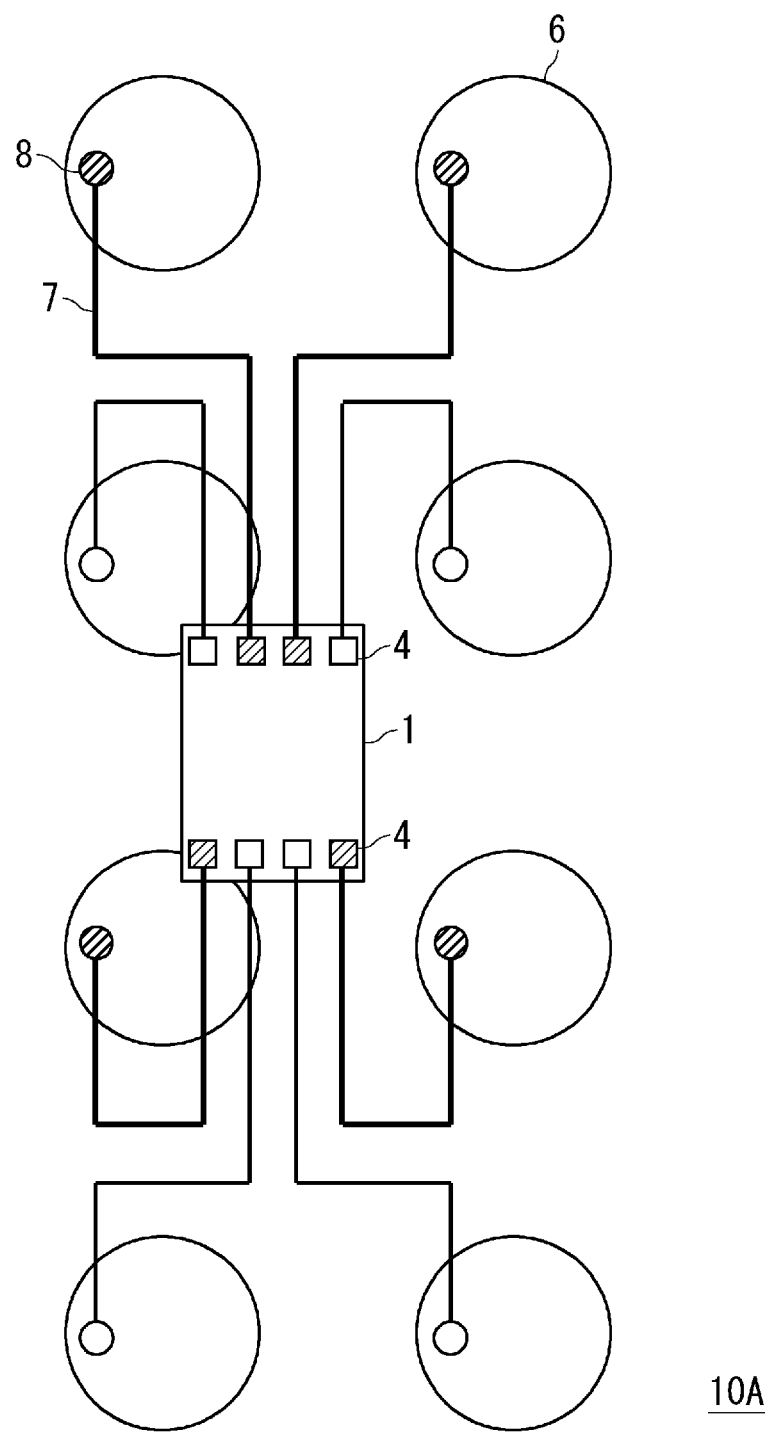
FIG. 9A shows a second example of a method for controlling a phased array antenna apparatus according to a second example embodiment.

FIGS. 8A and 9A show a configuration of a phased array antenna apparatus 10A according to a second example embodiment. As shown in FIGS. 8A and 9A, the phased array antenna apparatus 10A includes eight patch antennas 6 arranged in a two-dimensional 2×8 array, and a semiconductor IC chip 1 connected to the patch antennas 6. Each of the patch antennas 6 includes one feeding point 8. Each of second input/output terminals 4a to 4h is connected to the feeding point 8 of a different one of the patch antennas 6.

Figure 8B:
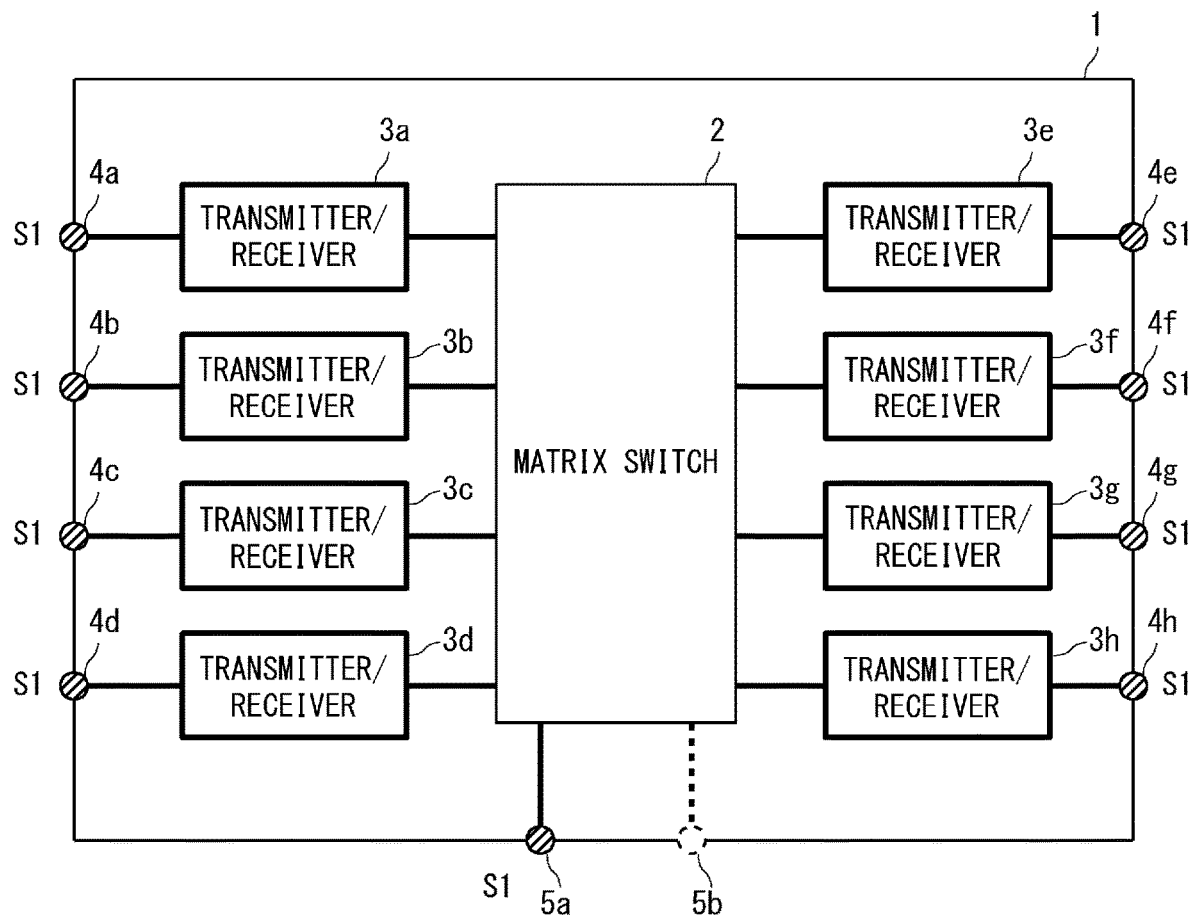
FIG. 8B shows the first example of the method for controlling the phased array antenna apparatus according to the second example embodiment.

FIGS. 8A and 8B show a first example of a method for controlling a phased array antenna apparatus according to the second example embodiment. As shown in FIG. 8B, in this example, a signal S1 is input to only one of the first input/output terminals 5a. A matrix switch 2 is set so that all of the eight second input/output terminals 4a to 4h are connected to the first input/output terminal 5a.

The feeding points 8 of the patch antennas 6 are disposed so that all of them are excited in the same polarization direction. After the phase and the amplitude of the same signal S1 are adjusted to a predetermined phase and a predetermined amplitude, the signal is fed to each of the patch antennas 6 so that they are excited in the same polarization direction. FIG. 8C shows an operation performed by the phased array antenna apparatus shown in FIGS. 8A and 8B. As shown in FIG. 8C, it is possible to emit a beam only in a specific direction by combining the signals of a plurality of patch antennas 6. Note that the beam S1 in FIG. 8C is emitted in a direction perpendicular to the drawing, i.e., perpendicular to the paper.

In the case where only the signal S1 is input, if the connection relation between the first input/output terminals and the second input/output terminals is fixed, only a half of the semiconductor IC chip can be used and hence it is wasteful. Although it is possible to input the same signal S1 to the two first input/output terminals 5, it is necessary to prepare two identical signals for a system that originally uses only one signal S1. Therefore, it is necessary to change the apparatus.

In contrast to this, according to the second example embodiment, as shown in FIG. 8A, it is possible, by using only one of the first input/output terminals 5, to distribute the same signal S1 to all the patch antennas 6 through the matrix switch 2. Therefore, there is no need to change the apparatus. Therefore, it is possible to reduce the development period and the cost for the phased array antenna apparatus.

Figure 9B:
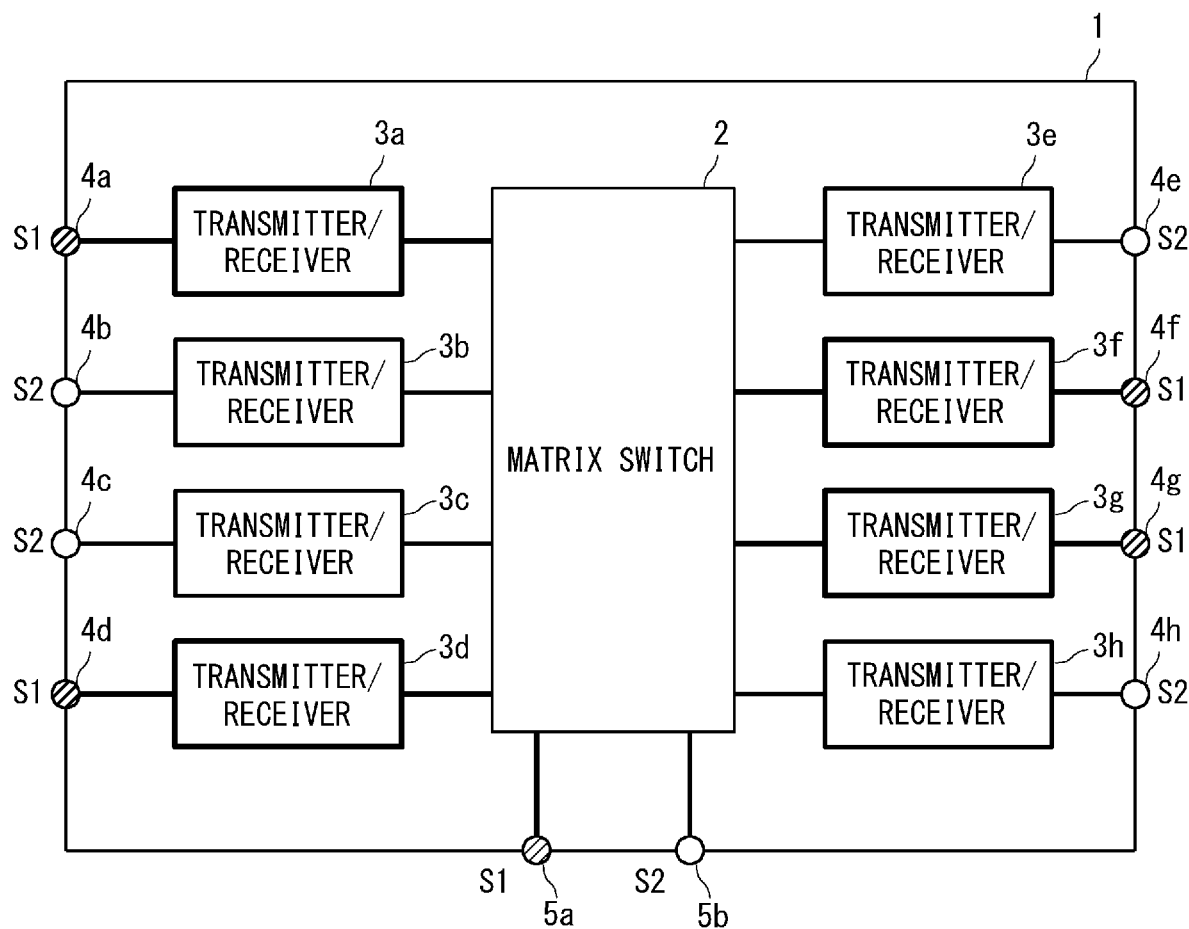
FIG. 9B shows the second example of the method for controlling the phased array antenna apparatus according to the second example embodiment.

FIGS. 9A and 9B show a second example of the method for controlling a phased array antenna apparatus according to the second example embodiment. As shown in FIG. 9B, in this example, a signal S1 is input to the one of the first input/output terminals, i.e., the first input/output terminal 5a and a signal S2 is input to the other first input/output terminal, i.e., the first input/output terminal 5b. The matrix switch 2 distributes the signals S1 and S2 so that the second input/output terminals 4a to 4d have the signals "S1, S2, S2, S1", respectively, and the second input/output terminals 4e to 4h have the signals "S2, S1, S1, S2" respectively.

Figure 9C:
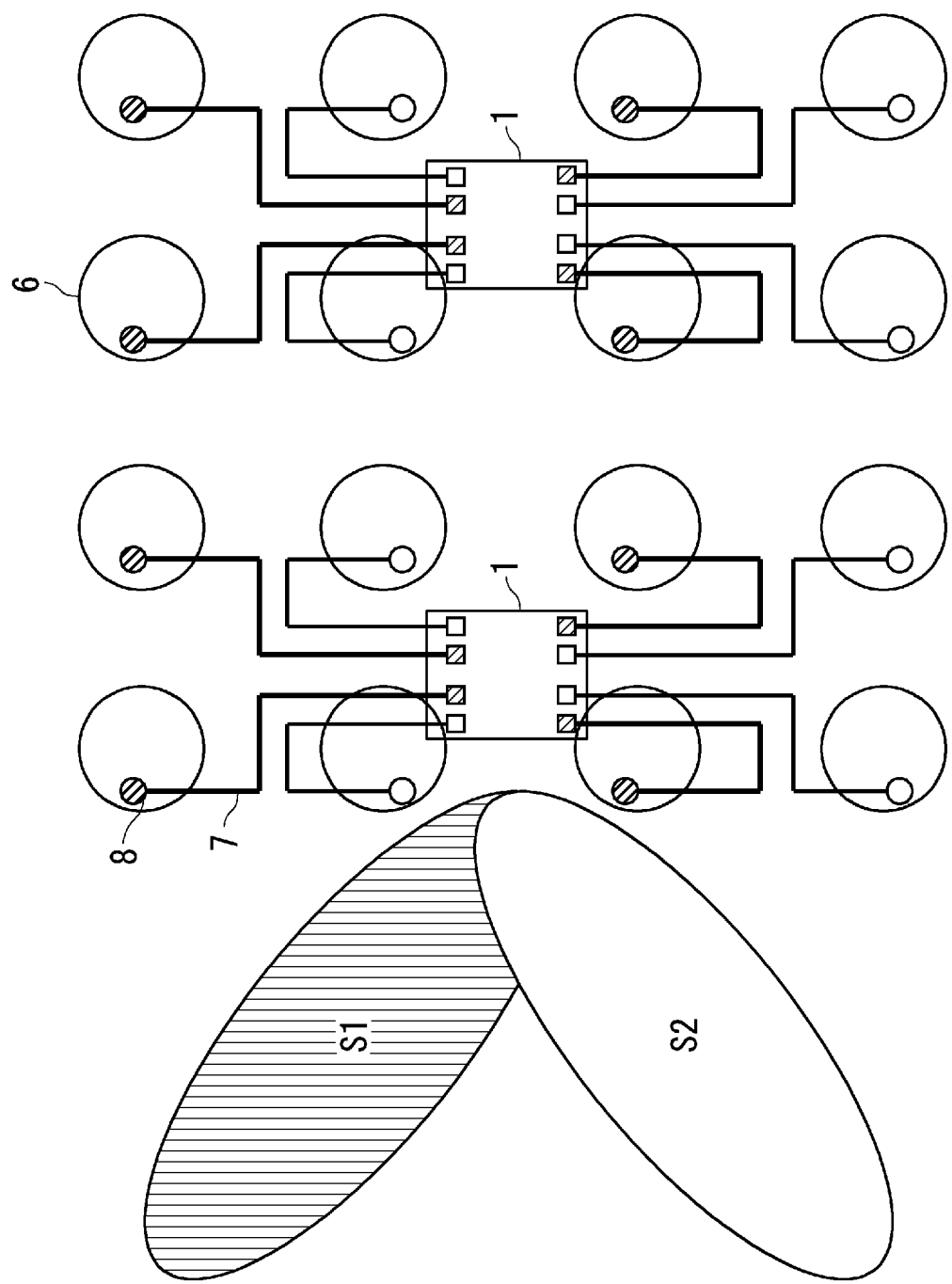
FIG. 9C shows an operation performed by the phased array antenna apparatus shown in FIGS. 9A and 9B.

As shown in FIG. 9A, signals are fed so that the row of patch antennas 6 to which the signal S1 is supplied and the row of patch antennas 6 to which the signal S2 is supplied are arranged in an alternate manner. FIG. 9C shows an operation performed by the phased array antenna apparatus shown in FIGS. 9A and 9B. As shown in FIG. 9C, it is possible, by adjusting the phases and the amplitudes of the signals S1 and S2, to emit two beams while controlling the directions of the emitted beams independently of each other. Note that it is possible, by adjusting the directions of the beams S1 and S2 so that they do not interfere with each other, to simultaneously transmit different signals to two users by using the same frequency. Therefore, ideally speaking, the utilization ratio of frequencies is doubled. Note that the beams S1 and S2 in FIG. 9C are emitted in a direction perpendicular to the drawing, i.e., perpendicular to the paper.

As described above, the matrix switch 2 can change the connection relation according to the transmission/reception signal supplied to the patch antennas 6. In this way, as shown in FIGS. 8C and 9C, the operation can be dynamically switched between a one-beam operation and a two-beam operation. For example, in the case where there is only one user or where it is desired to communication with a distant entity, the same signal S1 is supplied to all the patch antennas 6 and hence the one-beam operation is performed. Further, when there are a plurality of users, it is possible to increase the transmission capacity by spatially multiplexing two beams. Therefore, it is possible to perform optimum communication according to the use and/or the environment.

Note that in the second example embodiment, examples in which the number of patch antennas 6 for each semiconductor IC chip 1 is eight and the number of data is two are described. However, needless to say, the number of antennal, the number of data, and the like can be changed as desired.

As described above above-described, according to the example embodiment, it is possible to realize a suitable layout according to the arrangement of antenna elements and the positions of feeding points by using the same semiconductor IC chip.

It should be noted that the present disclosure is not limited to the above-described example embodiments and they can be modified as desired without departing from the spirit thereof. Although all the wiring lines are bent at right angles in the drawings, they may be bent at an arbitrary angle. The example embodiment can be applied to a communication apparatus (a base station and a terminal) using a phased array antenna apparatus, used for a mobile phone, a wireless LAN, satellite communication, or the like. Further, the present disclosure may be applied to a radar apparatus using a phased array antenna apparatus.

According to the present disclosure, it is possible to provide a phased array antenna apparatus and its control method capable of changing a connection relation between antenna elements and input/output ports on a semiconductor IC chip according to the arrangement of the antenna elements and the positions of feeding points.

The first and second embodiments can be combined as desirable by one of ordinary skill in the art.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

What is claimed is:

1. A phased array antenna apparatus comprising at least four antenna elements arranged in a two-dimensional array, and a semiconductor chip connected to the antenna elements, wherein
the semiconductor chip comprises:
at least two first input/output terminals through which a transmission/reception signal is input/output between the phased array antenna apparatus and an external apparatus connected to the phased array antenna apparatus;
a plurality of second input/output terminals connected to feeding points of the antenna elements through respective feed lines, the plurality of second input/output terminals being terminals through which the transmission/reception signal is input/output; and
a matrix switch capable of changing a connection relation between the first input/output terminals and the second input/output terminals.

2. The phased array antenna apparatus according to claim 1, wherein the matrix switch changes the connection relation according to an arrangement of the antenna elements and/or positions of the feeding points in the antenna elements.

3. The phased array antenna apparatus according to claim 1, wherein
each of the antenna elements comprises two feeding points configured to generate two types of polarized waves orthogonal to each other, and
the matrix switch changes the connection relation so that characteristics of at least feed lines extending from feeding points for the same type of polarized waves to corresponding second input/output terminals become roughly equal to each other.

4. The phased array antenna apparatus according to claim 3, wherein the matrix switch changes the connection relation so that characteristics of the feed lines from all the feeding points to the corresponding second input/output terminals become roughly equal to each other.

5. The phased array antenna apparatus according to claim 1, wherein
each of the antenna elements includes one of the feeding points, and
the matrix switch changes the connection relation according to the transmission/reception signal of the antenna elements.

6. The phased array antenna apparatus according to claim 1, further comprising a plurality of transmitters/receivers each of which is disposed between the matrix switch and a respective one of the plurality of second input/output terminals.

7. A method for controlling a phased array antenna apparatus comprising at least four antenna elements arranged in a two-dimensional array and a semiconductor chip connected to the antenna elements, wherein
a connection relation between at least two first input/output terminals and a plurality of second input/output terminals is changed by a matrix switch according to an arrangement of the antenna elements and/or positions of feeding points in the antenna elements, the at least two first input/output terminals being terminals through which a transmission/reception signal is input/output between the phased array antenna apparatus and an external apparatus connected to the phased array antenna apparatus, and the plurality of second input/output terminals being terminals connected to the feeding points of the antenna elements through respective feed lines, and being terminals through which the transmission/reception signal is input/output.

8. The method for controlling a phased array antenna apparatus according to claim 7, wherein
each of the antenna elements comprises two feeding points configured to generate two types of polarized waves orthogonal to each other, and
the matrix switch changes the connection relation so that characteristics of at least feed lines extending from feeding points for the same type of polarized waves to corresponding second input/output terminals become roughly equal to each other.

9. The method for controlling the phased array antenna apparatus according to claim 8, wherein the matrix switch changes the connection relation so that characteristics of the feed lines from all the feeding points to the corresponding second input/output terminals become roughly equal to each other.

10. The method for controlling the phased array antenna apparatus according to claim 7, wherein
each of the antenna elements includes one of the feeding points, and
the matrix switch changes the connection relation according to the transmission/reception signal of the antenna elements.

* * * * *